Fig. 1.

INVENTOR.
IVAN DWAYNE POMEROY
BY
ATTORNEYS

INVENTOR.
IVAN DWAYNE POMEROY
BY
ATTORNEYS

Jan. 26, 1971     I. D. POMEROY     3,559,175

CREDIT CARD SYSTEM

Filed Oct. 23, 1967            6 Sheets-Sheet 4

Fig. 5.

INVENTOR.
IVAN DWAYNE POMEROY
BY Lyon & Lyon
ATTORNEYS

United States Patent Office 3,559,175
Patented Jan. 26, 1971

3,559,175
CREDIT CARD SYSTEM
Ivan Dwayne Pomeroy, 800 Hindry,
Inglewood, Calif. 90301
Filed Oct. 23, 1967, Ser. No. 677,305
Int. Cl. H04q 9/00
U.S. Cl. 340—152                                   8 Claims

ABSTRACT OF THE DISCLOSURE

A credit card system wherein a credit card is coded both with identification and credit balance data. A data processing system reads the credit balance data at the time of a purchase. The purchase amount is automatically substracted from the credit balance, and the new balance is stored in the credit card. If the credit balance is insufficient, the data processor transmits the identification data to a central data file to update the balance whereupon the sale may be completed and a new balance stored in the card. If the balance is still insufficient after it is updated, the sale is terminated. The identification data also may be verified to detect invalid or stolen cards.

---

This invention relates to a credit card system, and more particularly to a system wherein a credit card has stored therein data relating to an individual's credit balance, as well as identification data, and an electronic system for reading data from the card and updating the credit balance stored therein from time to time.

As is well-known, the use of credit cards has become quite widespread, and in the future credit cards may tend to actually replace the exchange of money in a substantial portion of the consumer marketplace. Credit card systems currently employed are inadequate in the control of misuse of credit cards in our expanding economy. The paramount objective of credit card systems is to provide an adequate control or prevention of abuse of the credit privilege at a reasonable cost and with a minimum of delay and inconvenience to the customer. The most common systems in present use attempt to achieve these objectives by an adequate preinvestigation of credit rating or eligibility, and by permitting processing of purchases up to a nominal amount without the necessity of contact with a central control agency. While the basic need is to control the maximum accumulated amount of credit extended, this is not feasible and, thus, the control used is merely an attempt to place a limit on the average rate of extended credit with the hope that any run away situation will be recognized in adequate time to allow repossession of the card before the situation gets out of hand. The limited success of this technique is indicated by the relatively high surcharge, or processing cost, of approximately three percent, and is aggravated by the long delays in receiving invoices from merchants, by the normal delays in receiving payments on billings, as well as the delays and difficulties in retrieving a credit card once the decision is made to suspend credit. The long lists of invalid serial numbers published and distributed regularly to merchants is but mute evidence of the difficulties involved. The requirement of comparing each proffered card with such lists poses a dilemma to the merchant. Even the provision of some of the automatic sorting and comparison schemes known in the prior art solve only a small portion of the problem and represent a considerable added expense. The "on-line" computer schemes designed to circumvent this problem are expensive and are only suitable for relatively high margin type consumer sale operations as represented by department stores and the like. Such systems are completely out of the picture for low margin operations, such as consumer food sales, and are questionable and marginal for some of the other areas in which promotion and penetration is and has been attempted.

In accordance with the present invention, control of the total accumulated amount of credit extended is made possible without the necessity of an on-line computer facility and without the necessity of contact with the central control agency except at infrequent intervals where necessary to update the credit balance, such as to reflect payments made. Extensive data storage and addressing capability is not necessary because of the storage capability of the credit cards themselves in a small amount relative only to the account of the individual using the card. Addressing is enabled by presentation of the card at the time of purchase, and thus, up-to-date credit balance information is made available to each and every merchant possessing equipment as needed. In this way, the data processing equipment need only have the capability of reading and writing the data on the card, communicating with and accepting updating information from a central control agency, and of performing simple arithmetic operations, such as subtracting the purchase price amount from the card balance.

Accordingly, it is an object of the present invention to provide an improved credit card system.

A further object of this invention is to provide a credit card system employing a credit card device having credit balance data stored therein.

It is another object of this invention to provide a credit card system wherein a credit card having both identification data and credit balance data stored therein is used in conjunction with a data processor to examine the credit balance data and revise the same after a purchase had been made.

An additional object of this invention is to provide a credit card system wherein a credit card having both identification data and credit balance data stored therein is utilized, and wherein the credit balance data may be updated from time to time.

A still further object of this invention is to provide an improved credit card in which credit balance data may be stored.

These and other objects and features of the present invention will become better understood through a consideration of the following description taken in conjunction with the drawings in which:

FIG. 2b illustrates an exemplary form of one of the components of the unit shown in FIG. 2a;

FIG. 3 is an exploded view of an exemplary credit card according to the present invention;

Figure 1:
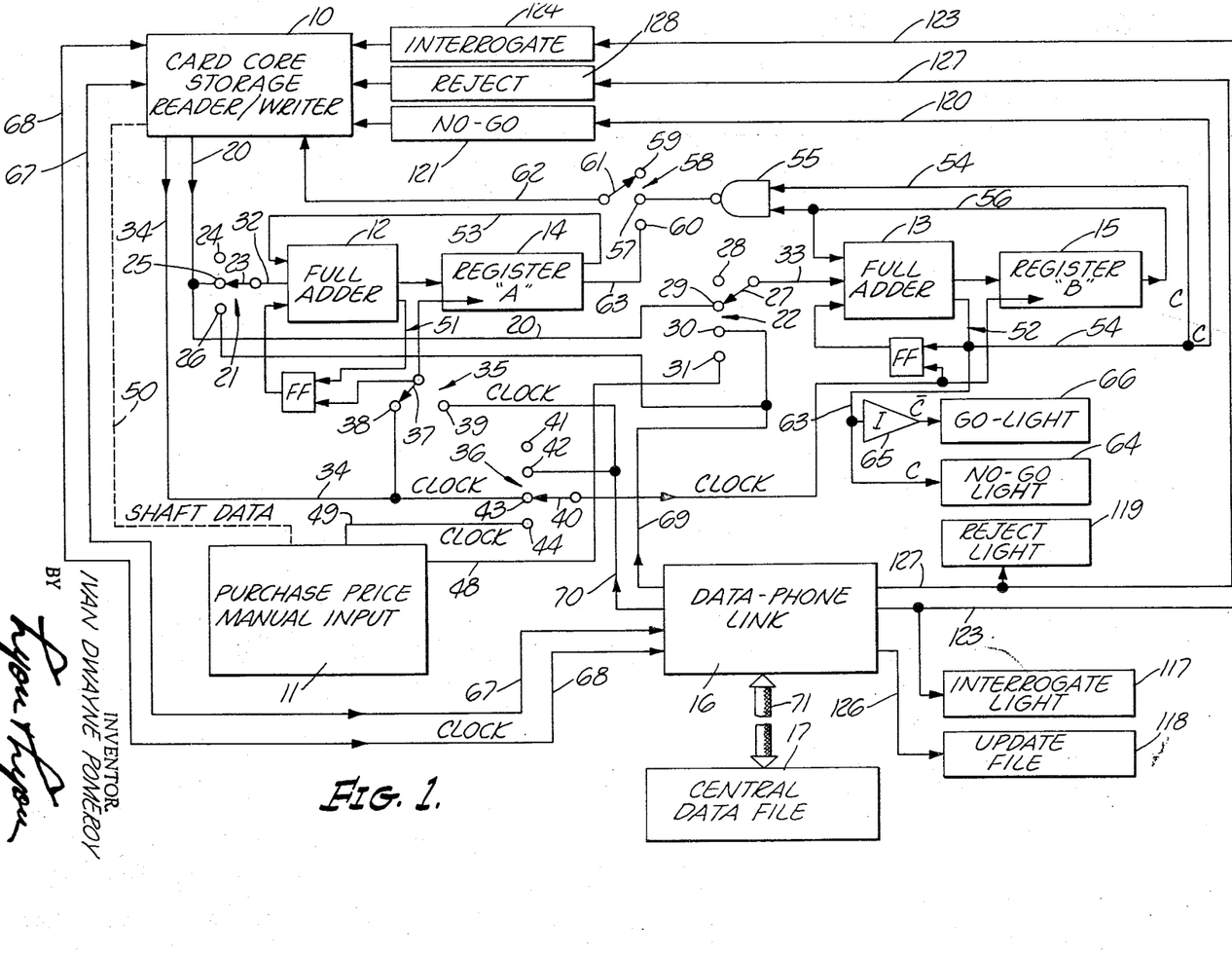
FIG. 1 is a block diagram of a credit card data processing system according to the present invention.

Turning now to the drawings, FIG. 1 illustrates a block diagram of a credit card system according to the present invention. The system, which may communicate with a central data file, may be considered as four interconnected subssytems, (1) a card storage reader/writer, (2) a purchase price manual input unit, (3) storage and arithmetic circuits, and (4) a data-phone link. Briefly, at the time a purchase is made a credit card having credit balance data stored therein is presented to a sales clerk, and this data is read into a register. The purchase amount is entered into the system and subtracted from the credit balance. If the credit balance is sufficient to cover the transaction, the sale is completed and the new balance is read back into the credit card. In the event the credit balance is insufficient, the central data file is interrogated and may then update the credit balance. If the new balance is sufficient the sale is completed, but if insufficient, either the original balance or an updated balance is returned to the credit card and the transaction is terminated. Invalid cards, stolen cards, and the like, also may be detected and the sale terminated, or other appropriate action taken.

Considering the system illustrated in FIG. 1 in more detail, the same includes a card core storage reader/writer 10, a purchase price manual input unit 11, and arithmetic and storage circuits including full adders 12 and 13 and A and B registers 14 and 15. A data phone link 16 is provided which may selectively communicate with a central data file 17.

Data from the reader/writer 10 is supplied through a line 20 through switches 21 and 22 to the respective adders 12 and 13. The switch 21 includes a movable contact 23 and three fixed contacts 24 through 26, and the line 20 is connected to the contact 25. The switch 22 includes a movable contact 27 and four fixed contacts 28 through 31, and the line 20 is connected to the contact 29. The movable contacts 23 and 27 of the switches 21 and 22 are connected through respective lines 32 and 33 to the adders 12 and 13.

A clock output line 34 from the reader/writer 10 is coupled through a switch 35 to the A register 14 and through a switch 36 to the B register 15. The switch 35 includes a movable contact 37 and two fixed contacts 38 and 39. The switch 36 includes a movable contact 40 and four fixed contacts 41 through 44. The line 34 is connected to the fixed contacts 38 and 43 of the respective switches 35 and 36.

As will be described in more detail subsequently, the reader/writer 10 serves to read the credit balance data from a credit card into the A and B registers 14 and 15. The sales or purchase amount then is subtracted from the credit balance by the adder 13, and the new balance appears in the B register 15. The A register 14 serves to store the credit balance from the card, or an updated balance, in the event it is necessary to return either of these balances to the card. The nine's complement of the credit balance is stored in the card so that subtraction of the purchase amount may be accomplished by simple addition rather than requiring the necessary circuitry to complement and add one to provide the nine's complement prior to addition. The update balance also is provided in the nine's complement form.

The purchase price manual input unit 11 includes keys or the like, which will be discussed below, for entering the sales amount into the adder 13. This unit includes a data output line 48 which is connected to the fixed contact 31 of the switch 22, and a clock output line 49 which is connected to the fixed contact 44 of the switch 36. This unit also includes a mechanical shaft data output 50 which is coupled with the reader/writer 10 to enable the sales amount to be printed on a sales slip.

Returning briefly to the adders 12 and 13 and the A and B registers 14 and 15, each of the adders includes a respective carry loop 51 and 52. A set-reset flip-flop is included in each loop and is clocked by the clock signals from respective switches 35 and 36 which are connected to the complement inputs thereof. These flip-flops store the respective carries between each shift pulse applied to the associated A and B registers. A line 53 is connected from the output of the A register 14 to the input of the adder 12 to recirculate data. The carry output of the adder 13 is coupled through a carry line 54 to one input of a "nand" gate 55. The output of the B register 15 is coupled through a line 56 to another input of the "nand" gate 55. This output of the register 15 also is coupled by the line 56 to an input of the adder 13 to recirculate data. The output of the gate 55 is coupled to a fixed contact 57 of a switch 58. The switch 58 includes additional fixed contacts 59 and 60, and a movable contact 61. The movable contact is connected through a line 62 to the input of the reader/writer 10, and the output of the A register 14 is connected through a line 63 to the fixed contact 60. The switch 58 enables either the contents of the register 14 or the register 15 to be returned to the card storage.

The carry line 54 from the adder 13 also is connected through a line 63 to a "no-go" light 64. This line 63 also is connected through an invert 65 to a "go" light 66. If there is a carry from the adder 13 after the purchase amount is subtracted from the credit balance from the card, the "no-go" light 64 is energized. If there is no carry, the "go" light 66 is energized. The subsequent operation and procedures in either of these events will be covered in detail subsequently.

An individual's credit balance will vary from time to time because of purchases and payments made and, accordingly, provision is made for updating the credit balance in the credit card as well as to verify the validity of the card. The card may have identification data, or a serial number, in the form of notches along the edge thereof, raised areas, punch holes or the like. This identification data is supplied from the reader/writer along a line 67 to the data-phone link 16. Clock pulses are supplied along a line 68 from the reader/writer 10 to the link 16. The data-phone link 16 supplies credit balance data through a line 69 to the fixed contact 30 of the switch 22, and clock pulses along a line 70 to the fixed contact 42 of the switch 36. The link 16 is coupled by a telephone link, indicated by a cable 71, with the central data file 17.

As noted above, when a carry from the adder 13 exists, the "no-go" light 64 is energized indicating that the credit balance is insufficient to cover the purchase. The central data file 17 then is interrogated to update the credit balance if appropriate, i.e., if the present credit balance is larger than that which was stored in the card and if the card is not a stolen or invalid one. In the interrogation, the identification data from the card is read into the data phone link 16 through the line 67. In the simplest form of the present invention, this identification data need merely be displayed at the central data location and checked by an operator to determine if the card is valid and if the credit balance should be updated. If the balance is to be updated the operator causes the new balance to be transmitted to the phone link 16 which then supplies this balance along the line 69 and through the switch 22 to the adder 13. Clock pulses to enable the register 15 to shift are applied through the line 70, the switch 36 and a line 75 to the register 15. This data and clock pulses also are supplied to the adder 12 and register A, respectively. If there is no carry from the adder 13 the "go" light 66 is energized, and the sale is then completed and the updated balance minus the purchase amount is stored in the credit card. If there still is a carry from the adder 13, thereby indicating that even the updated balance is insufficient to cover the purchase, the "no-go" light 64 is again energized and the sale is terminated. In this case, the updated balance is returned to the credit card from the A register 14.

The remaining operation and functions of the system illustrated in FIG. 1 will be covered below after a discussion of an exemplary mechanization of the reader/writer 10 and manual input unit 11. This mechanization may take the form of a unit 82 illustrated in FIG. 2a. The unit 82 includes a housing 83, which may be formed of any suitable material such as plastic, having a control panel 84. A receptacle 85 on the panel 84 of the housing 83 is provided to receive and position a credit card. The housing 83 may house the entire electrical system illustrated in FIG. 1 with the exception of the central data file 17, and also houses the various mechanical components, for enabling credit balance and identification data to be read from a credit card, the purchase price to be entered into the system, and a sales slip to be imprinted.

Figure 2A:
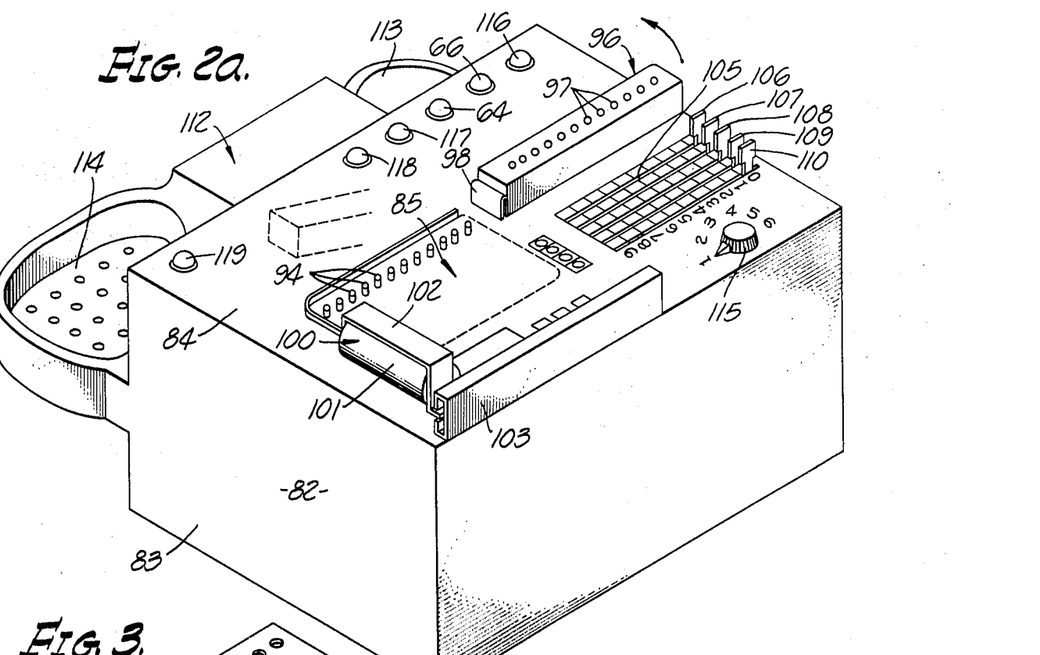
FIG. 2a is a perspective view of a control unit which serves as a card storage reader/writer and for purchase price data entry, and which may house the principal components of the present system.
Figures 2B, 3:
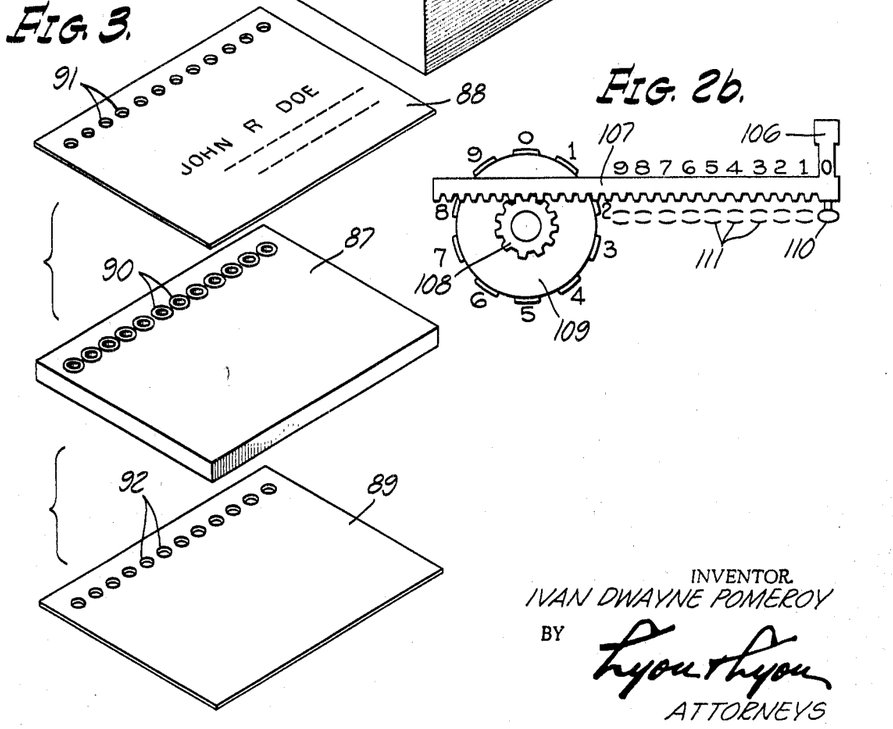

Turning for the moment to FIG. 3, an exemplary credit card may be laminated from plastic material having an intermediate layer 87 and top and bottom layers 88 and 89. A plurality of conventional magnetic cores 90 are embedded in the intermediate layer 87, and the top and bottom layers 88 and 89 include a plurality of apertures 91 and 92 for enabling an electrical conductor or pin to be inserted through the cards and the cores embedded therein. Typically, the intermediate layer 87 may be an acetate sheet approximately twenty-five mils thick, and the top and bottom layers 88 and 89 may be acetate sheets approximately five to ten mils thick. The sheets may be joined together by an adhesive. Alternatively, the entire assembly may be compression molded of plastic as a one piece construction plus the cores 90. Typically, ten cores arranged in a line as shown in FIG. 3 are employed. The cores 90 serve to store credit balance data. Groups of cores may be employed for the storage of different types of credit such as, restaurant and retail store credit, travel credit, major appliance credit, and so forth.

The card receptacle 85 of the unit 82 shown in FIG. 2a includes a plurality of electrical conductors or pins 94 which pass through the cores 92 in the credit card when the same is positioned in the receptacle 85. The credit card also may include the typical data, e.g., store name, individual's name and card serial number. Additionally, the card may be coded with identification data corresponding to the serial number, and this may take the form of notches (not shown) or the like along the edge of the card. As will be described subsequently, these notches may be sensed by leaf-type switches to supply the identification data through the data-phone link 16 in FIG. 1 to the central data file 17. A contact arm 96 having a plurality of female contacts 97 is hinged at 98. This arm 96 may be pivoted to enable the female contacts 97 thereof to engage the pins 94 thereby completing electrical circuits through each of the cores 90 of the credit card to enable reading and writing data from and to these cores.

A substantially conventional imprinter roller assembly 100 including a roller 101 and a support handle 102 is provided on the panel 84 of the housing 83. The roller assembly 100 is employed to imprint a sale slip in a conventional manner. The roller assembly 100 is supported in a bracket 103, and the assembly 100 additionally is coupled with a multiple pull multiple position switch for enabling successive sampling of the cores 90, as will be described subsequently, and read out of identification data as the assembly 100 is moved from left to right. Also, the switching assembly allows credit balance data to be entered into the cores 90 as the assembly 100 is moved from right to left upon completion or termination of a sale.

The unit 82 in FIG. 2a further includes a manual input unit 105 which includes a plurality of manually movable keys or levers 106 through 110. These levers are employed for entering the purchase amount, with the lever 106 being used for cents, the lever 107 for dimes, the lever 108 for dollars, and so forth. Each lever may be coupled with a rack and pinion arrangement as illustrated in FIG. 2, wherein the lever 106 is shown coupled with a rack 107 which in turn is coupled with a pinion 108 and indicator wheel 109. The wheel 109 may serve to provide a visual decimal indication of a digit of the purchase price or may be used to imprint the same on the sales slip. The lever 106 also is coupled with a movable electrical contact 110 and a plurality of fixed contacts 111 to provide an electrical input of the purchase price to the system of FIG. 1. The electrical system may be simplified somewhat by utilizing only the three higher order levers 108 through 110 and thus only deal with rounded-off dollar amounts rather than cents. In this case, the lower order levers 106 and 107 may be mechanically coupled with the lever 108 to cause the purchase price to be rounded off to the nearest dollar.

The unit 83 also includes a cradle 112 for a telephone handset (not shown), a program selector switch knob 115, and a plurality of indicator lights 64, 66 and 116 through 119. The lights 64, 66 and 116 through 119 respectively serve to indicate the program conditions of "ready," "go," "no-go" "interrogate," "update complete," and "reject." The program selector knob 115 controls several switches, including the switches 22, 36 and 58 in FIG. 1. The six positions of the knob 115 select the program steps of "start," "process A," "process B," "sales complete," "interrogate," and "cancel." Briefly, in the first or start position, power is supplied to the electrical system and the ready light 114 is energized, and all counters, registers and flip-flops are cleared. In the process A position, the credit balance data is read from the credit card into the A and B registers 14 and 15 and the serial number data is read into a register in the data-phone link 16 as the roller assembly is moved from left to right as seen in FIG. 2a. In the process B position, the purchase price information, as selected by the levers 106 through 110, is supplied to the adder 13, and the B register 15 stores the difference between the credit balance and the purchase price. In the sales complete position, the roller assembly 100 is returned to its initial position by moving the same from right to left as seen in FIG. 2a, and the sales transaction is completed. In the interrogate position, a telephone handset is placed in the cradle 112 which has a pickup 113 and speaker 114, and a central data file number is dialed. When the central data file responds, the interrogate light 117 is energized and the card serial number is transferred from the data-phone link 16 to the central data file 17. The central data file 17 then proceeds to transmit and updated balance, if appropriate, which balance is supplied through the data-phone link 16 to the A and B registers 14 and 15. In the cancel position, which is used where the sales transaction is to be cancelled, the data in the A register 14 is returned to the credit card as the roller assembly 100 is returned to its initial position.

Turning again to the system shown in FIG. 1, the carry line 54 from the full adder 13 also is coupled through a line 120 to a "no-go" solenoid 121 which in turn serves to actuate an imprinter (not shown) in the reader/writer 10 to print a "no-go" indication on the sales slip. This indication, which preferably is in coded form, indicates that the original or updated balance was insufficient. The data-phone link 16 provids an output on a line 123 to energize the interrogate light 117 and to operate an interrogate solenoid 124. This solenoid imprints the sales slip to record the fact that the central data file was interrogated. This serves to provide a record on the sales slip for the central data file as to when and where the credit card was updated. The data-phone link 16 also has an output line 126 which energizes the "update complete" light 118. In the event an invalid or stolen card is being used by an individual, the central data file 17 also may send a "reject" signal to the data-phone link 16, and this signal is supplied through an output line 127 to the "reject" light 119 and to a reject solenoid 128. The reject solenoid 128 causes a reject indicia to be printed on the sales slip to help enable the credit card to be tracked down if the same is not taken by the sales clerk at the time of the attempted purchase.

Figure 4:
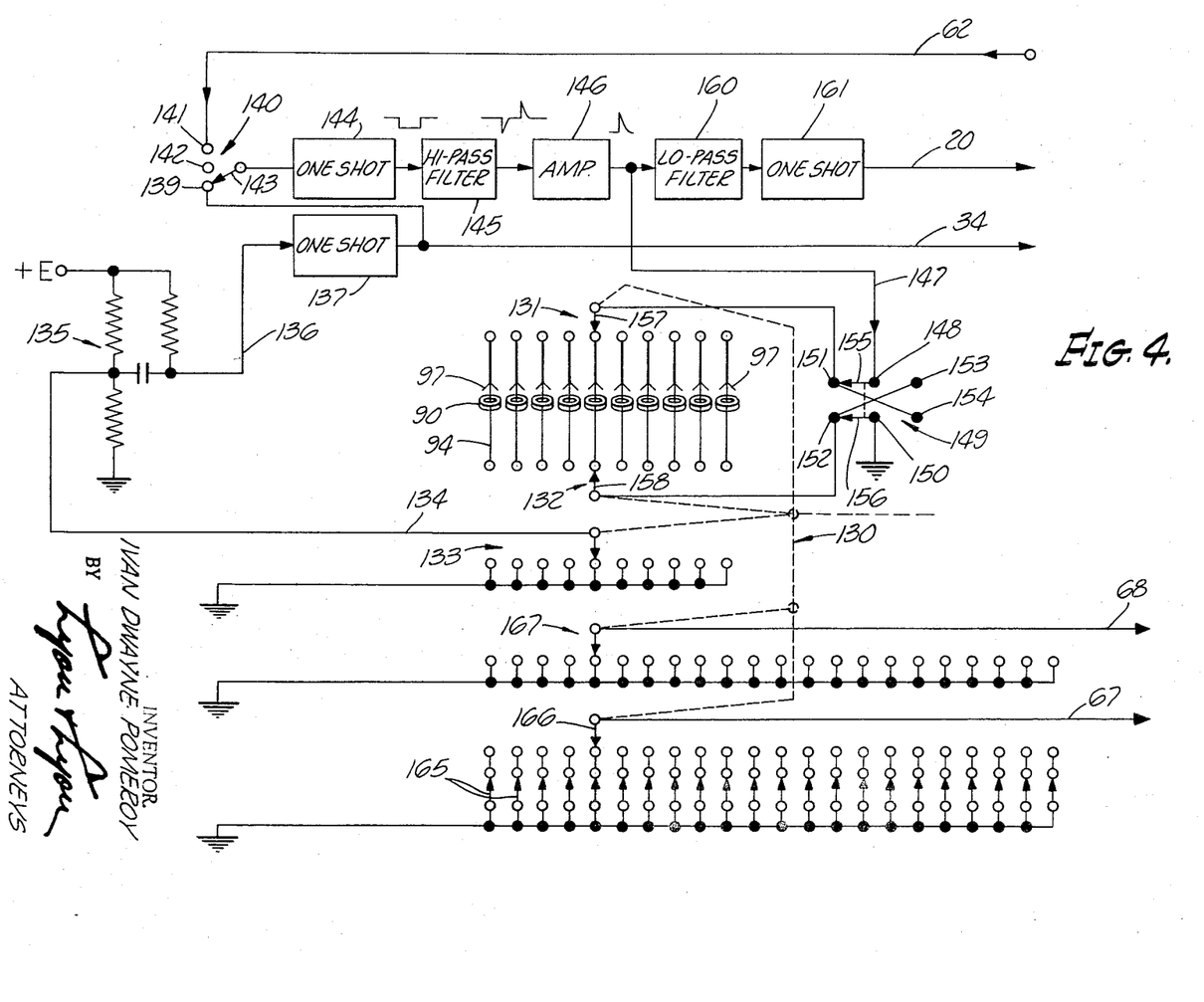
FIG. 4 is a diagram of a credit card reader/writer circuit.

FIG. 4 illustrates a circuit diagram of a reader/writer 10 for reading the credit balance data from the cores 90 and also for reading the serial number from the credit card. In this exemplary embodiment, maximum advantage is taken of the manual performing of sequencing operations by the sales clerk. A multiple-pole multiple-position selector switch 130 is actuated by the roller assembly 100. Two poles 131 and 132, each having ten positions, of the switch 130 select in succession the female connectors 97 and the connector pins 94 passing through the appropriate magnetic cores 90 being sampled. A third pole 133, also having ten positions, of the switch 130 generates a trigger signal and at each of the ten switch positions just after the first two switch poles 131 and 132 have selected the respective cores being sampled. The trigger signals from the switch pole 133 are applied by a line 134 through a filter network 135 and a line 136 to a one-shot trigger 137. If the particular switch 130 employed has any contact bounce problem, a set-reset type flip-flop may be used in place of the filter 135. The output of the trigger 137 is applied on the line 34 to supply clock pulses to the A and B registers 14 and 15 in FIG. 1. This output also is coupled to a fixed contact 139 of a switch 140. The switch 140 includes two additional fixed contacts 141 and 142, and a movable contact 143 which is coupled to the input of a one-shot trigger 144. The output of the trigger 144 is filtered by a high pass filter network 145, which may be an RC differentiating network, to provide a short positive going, fast rise time pulse to a transistorized emitter-follower power amplifier 146. The output of the amplifier 146 is connected through a line 147 to a fixed contact 148 of a reversing type switch 149 having a grounded contact 150, cross-coupled fixed contacts 151 through 154, and movable contacts 155 and 156. The fixed contacts 151 and 152 are connected to respective movable contacts 157 and 158 of the first two poles 131 and 132 of the switch 130. Thus, the output of the amplifier 146 is applied to the connector pin 94 passing through the selected core 90. If a binary one is stored in the core, the induction of the interrogate current pulse from the amplifier 146 causes a large flux change and this pulse effectively encounters a large inductance thereby inducing a large amplitude long duration pulse across the core connector pin. This resulting long duration pulse passes through a low-pass filter 160, which may be an RC integrating network, with little attenuation, and triggers a one-shot trigger 161. The output of the trigger 161 appears on the line 20 and represents, in binary form, the credit balance data from the credit card. This data is applied to the full adders 12 and 13 and hence to the respective A and B registers 14 and 15. If the interrogated core 90 contains a binary zero, the interrogation current pulse causes very little additional induction in the core and, thus, the small effective inductance encountered produces only a small amplitude short duration pulse across the core connector pin. The pulse is further attenuated by the filter 160, and does not trigger the one-shot trigger 161. From the foregoing, it will be apparent that as the selector switch 130 is actuated through its ten positions, the cores 90 are successively sampled and the binary data stored therein is shifted into the A and B registers 15.

The cores 90 are typical eighty mil outside diameter, twenty-five mil thick, magnetic ferrite cores commonly used in data processing magnetic core storage systems. This type of core typically exhibits a one turn inductance of about 0.5 microhenry and a coercive force of about 0.3 oersted, or a required magnetizing force of about 0.15 ampere turn to produce flux reversal. The typical flux reversal charge is of the order of twelve lines. Thus, if the interrogate pulse amplifier produces a two-hundred miliampere pulse from a source impedance of about five ohms with a rise-time time constant of about 0.5 microsecond, a binary one output pulse voltage of about 0.3 volt peaking at about 0.5 microsecond will be produced. Similarly, a binary zero output pulse voltage of about 3.0 millivolts peaking at about twenty nanoseconds will be produced. These differences in these pulses are further enhanced by the time constant of the filter 160 which typically is approximately one-hundred nanoseconds thereby readily differentiating between binary one and zero signals.

The card core storage writing operation is essentially the reverse of the foregoing. The movable contacts 155 and 156 of the switch 149 are moved to engage the respective fixed contacts 153 and 154. This causes the direction of the interrogation current pulse through the cores to be reversed. Data from the register 14 or the register 15 is supplied along the line 62 through the switch 140, the trigger 144, and the filter 145 to the amplifier 146 which in turn supplies an interrogation pulse through line 147, the switch 149, and switch pole 132 to the cores 90. Clock pulses are supplied to either the A or B register 14 or 15, which is supplying the data being stored in the cores, by means of the switch pole 133, the line 134, the filter 135, the trigger 137 and the line 34 to shift the contents from the appropriate register. If a sale was completed, the new credit balance from the B register 15 is stored in the cores, but if a sale was terminated, the credit data from the A register 14 is stored in the cores.

The system shown in FIG. 4 also serves to read the card serial number for transmittal through the data-phone link 16 to the central data file 17 in FIG. 1 when such interrogation is required for updating the credit balance or if it is desired to further check the serial number with the central data file. Inasmuch as the card serial number is fixed, the same may be coded in the form of notches along the edge of the card, as punched holes, indentations, or the like. In either case, the coding preferably is binary and the code is sensed by a series of leaf-type switches 165. Twenty-two leaf switches are shown in FIG. 4, this number being required to accommodate a card population of four million cards. With this arrangement, the outputs of the twenty-two switches 165 are sampled successively by a movable contact 166 as the roller assembly 100 in FIG. 2a is moved from left to right during reading of data from the cores. The serial number data is applied on the line 67 to the data-phone link 16 in FIG. 1. Similarly, trigger pulses are generated by a switch pole 167 and supplied by the line 68 to the link 16. As will appear subsequently, the data-phone link 16 includes a twenty-two bit shift register for storing the serial number. This register may be eliminated by having the sales clerk operate the twenty-two position selector switch upon receiving a specific instruction (e.g., energization of the interrogate light 117) from the central data file.

Figure 5:
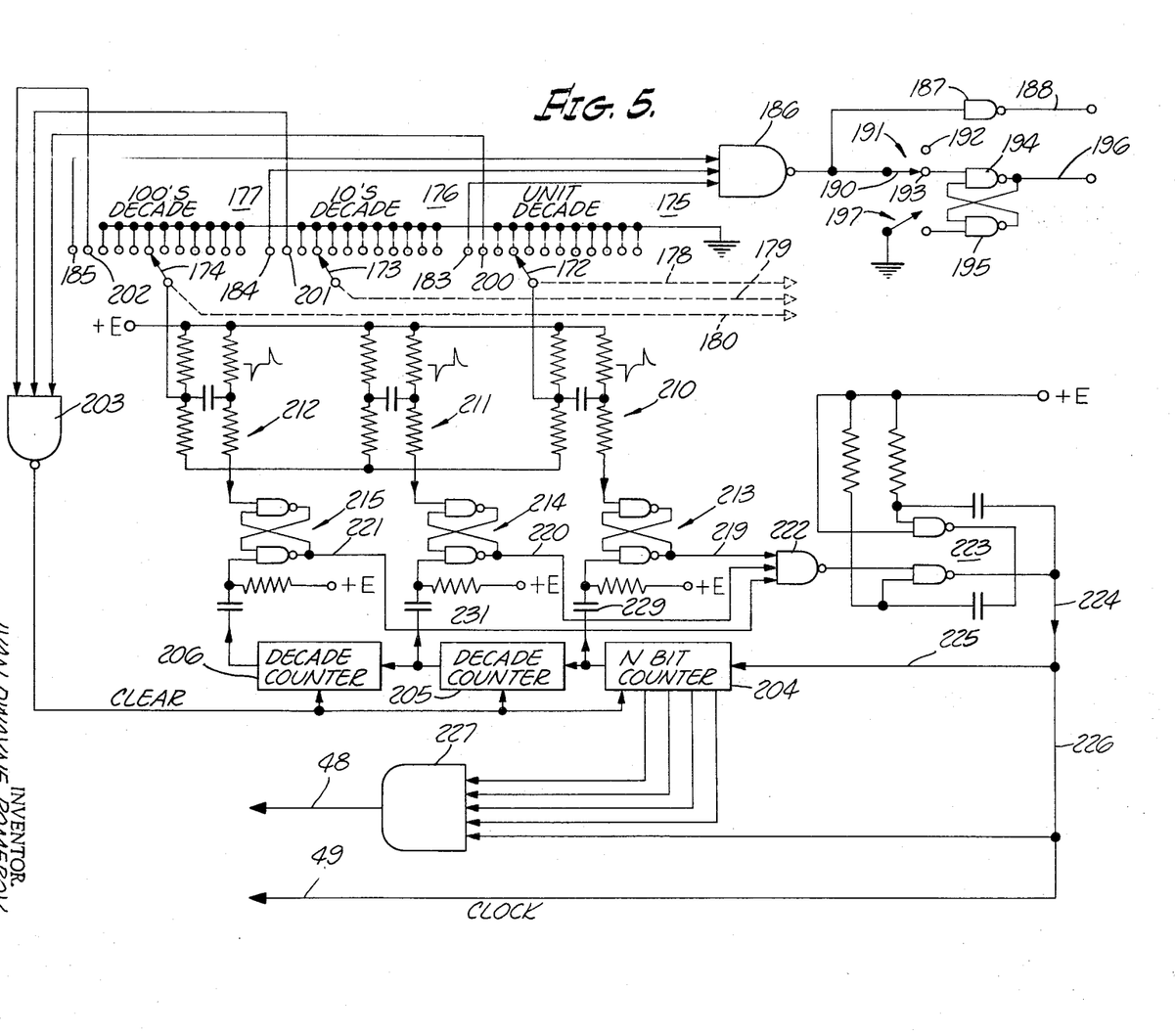
FIG. 5 is a diagram of a purchase price manual data input circuit.

Turning now to the purchase price manual input unit 11, FIG. 5 illustrates an exemplary circuit therefor. As noted earlier in connection with the description of FIG. 2a, some circuit simplification may be achieved by rounding off the purchase amount. In this case, only the levers 108 through 110 of the unit 82 in FIG. 2a generate purchase information. Thus, the levers 108 through 110 are mechanically coupled with respective movable contacts 172 through 174 of respective unit decade switch 175, 10's decade switch 176 and 100's decade switch 177. Each of the movable contacts 172 through 174 may correspond to the contact 110 in FIG. 2b, and the fixed contacts correspond to the contacts 111 in FIG. 2b. Mechanical connections 178 through 180 are shown coupled with the respective movable contacts 172 through 174 and these are employed to position a type bar, or type wheel such as the wheel 109 in FIG. 2b, to enable the rounded off sale amount to be imprinted on the sales slip. Movement of the levers 108 through 110 of the unit 82 in FIG. 2a operate the respective decade switches 175 through 177 which in turn cause the generation of purchase price data on an output line 48 and clock pulses on an output line 49 which in turn are supplied to the B register 15 as will be explained in more detail subsequently.

Each of the decade switches 175 through 177 includes an additional pair of contacts for initiating operation of the overall system and for clearing the unit 11 in FIG. 5. Thus, the switches 175 through 177 include first contacts 183 through 185, respectively, which in turn are coupled to the input of a nand gate 186. The output of the nand gate 186 is coupled through a nand gate 187 to a line 188 which serves to energize the ready light 116 on the unit 82 and to provide a clear signal for clearing all registers, counters and flip-flops in the system. The various clear and reset lines and inputs, which are well known to those skilled in the art, are not shown for clarity of illustration. The output of the gate 186 also is connected to a movable contact 190 of a switch 191 which has fixed contacts 192 and 193. The fixed contact 193 is coupled to one input of a nand gate 194 which is cross-coupled with another nand gate 195 to serve as a set-reset flip-flop. The output of the gate 194 is connected to a line 196 which provides a signal to a control relay (not shown) which supplies power to the remainder of the system. Inasmuch as the fixed contacts 183 through 185 are coupled to the gate 186, the respective movable contacts 172 through 174 must be in their initial positions before the system is turned on. A reset switch 197 is coupled to an input of the gate 195, and this switch is a monetary contact type switch which serves to reset the nand gate flip-flop when the roller assembly 100 is returned to its initial position. The second additional contacts 200 through 202 on the respective decade switches 175 through 177 are employed as a fail safe feature, and are coupled to the input of a nand gate 203 which is used to clear counters 204 through 206 of the manual input unit 11 shown in FIG. 5.

In operating the present credit card system, the program switch knob 115 in FIG. 2a is turned to the start position which causes the switch 191 to close. The movable contacts 172 through 174 of the decade switches 175 through 177 are initially positioned on the fixed contacts 183 through 185. The output of the nand gate 186 cause the "ready" light 116 to be energized and the system to be cleared. This gate also causes the nand gates 194 and 195 to provide an output to turn on the power supply to the remainder of the system. The program switch knob 115 is then turned to the "process A" position. As each of the levers 108 through 110 is positioned, the respective movable contacts 172 through 174 first cause the counters 204 through 206 to be cleared through the gate 203. If desired, the function of the first two contacts may be provided by a separate switch or switches.

As each lever 106 through 110 is positioned to indicate the purchase amount, the decade switches 175 through 177 are individually operated by a respective lever 108 through 110, and pulses are generated as the movable contacts of the decade switches engage the fixed contacts thereof. It will be apparent that a serial decimal to binary conversion is performed. The movable contacts 172 through 174 are coupled through respective filter networks 210 through 212 to one input of respective cross-coupled nand gate control circuits 213 through 215. If a contact bounce problem is present with the switches 175 through 177, the networks 210 through 212 may be replaced by set-reset flip-flops. The gate circuits 213 through 215 each include a pair of cross-coupled nand gates, and the outputs of these circuits are connected through respective lines 219 through 221 to a nand gate 222. The output of the gate 222 is connected to a clamp gated clock generator 223, the output of which is coupled to an output line 224. The output line 224 is connected to the clock output line 49, through a line 225 to an N bit counter 204, and through a line 226 to an input of an "and" gate 227. The output of the counter 204 is connected to the input of a decade counter 205, and connected through a capacitor 229 to a reset input of the control circuit 213. The counter 204 conventionally includes four flip-flops, and the "not" outputs of all four flip-flops are connected as inputs to the gate 227. This arrangement allows the first clock pulse from the clock 223 for each counter cycle to be passed by the gate 227 to the line 48. The decade counter 205 is coupled to the input of the decade counter 206, and through a capacitor 231 to a reset input of the control circuit 214. The output of the counter 206 is coupled through a capacitor to a reset input of the control circuit 215.

As each selector switch 172, 173 or 174 is individually moved to or past a fixed contact, a turn-on trigger pulse is applied to the respective control circuit 213, 214 or 215 which in turn starts the clock generator 223. The control circuit remains on as the clock generator continues to operate until a turn-off or reset signal is supplied to the control circuit from its associated counter. The output of the clock generator is supplied through the line 49 as a clock shift signal to the B register 15, and one pulses is supplied from the gate 227 as a data input to the adder 13. Thus, the first clock pulse in each sequence supplies a one to the adder 13. The output of the N bit counter 204 resets the control circuit 213 N clock pulses later. Accordingly, each time the movable contact 172 of the unit decade switch 175 engages one of the ten fixed contacts thereof, clock pulses are generated on the line 49 to shift the B register 15, and a one is inserted into the adder 13 from the line 48. The data in the B register 15 recirculates through a line 56 (FIG. 1) through the adder 13 and thus this one is added to the contents of this register. The foregoing operation is repeated as each of the ten fixed contacts is engaged by the movable contact 172 of the unit decade switch 175. This operation occurs as the sales clerk is positioning the lever 108 which in turn moves the movable contact 172. A similar operation occurs with the 10's decade switch 176, except the clock generator 223 runs 10N pulses before being stopped when the control circuit 214 is reset upon the decade counter 205 reaching its tenth count. In this case, the B register 15 is cycled ten times for each fixed contact engaged by the movable contact 173, and ten is added to the contents of this register. The operation with the 100's decade switch 177 also is similar, except the clock generator 223 now runs 100N pulses per fixed contact position, and one-hundred is added to the contents of the B register 15.

Figure 8:
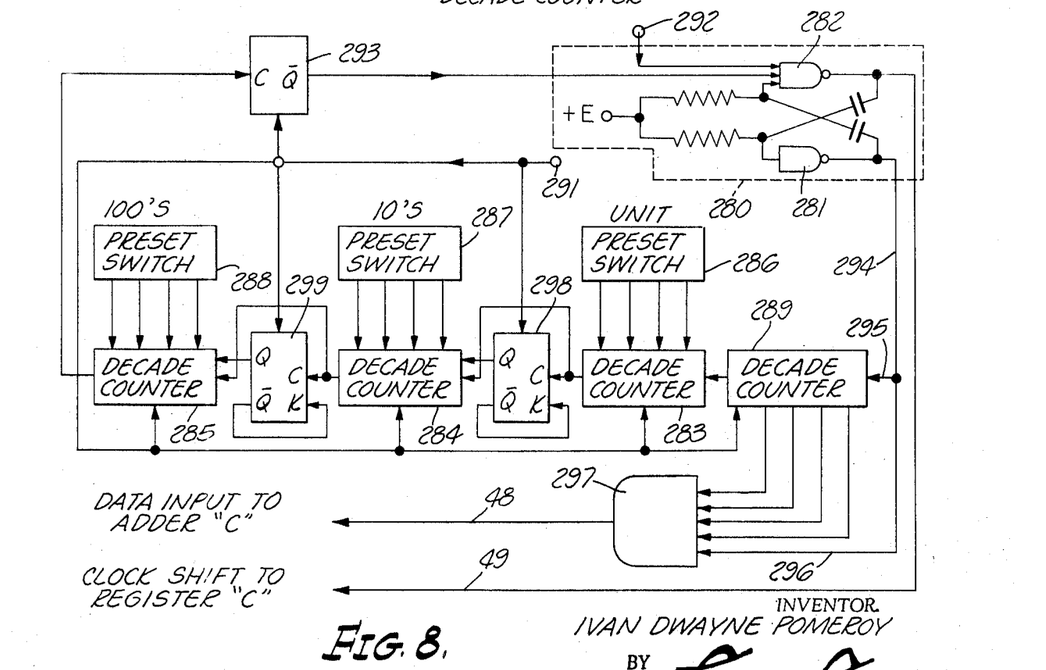
FIGS. 8 and 9 illustrate alternative arrangements for a part of the present data processing system.
Figure 9:
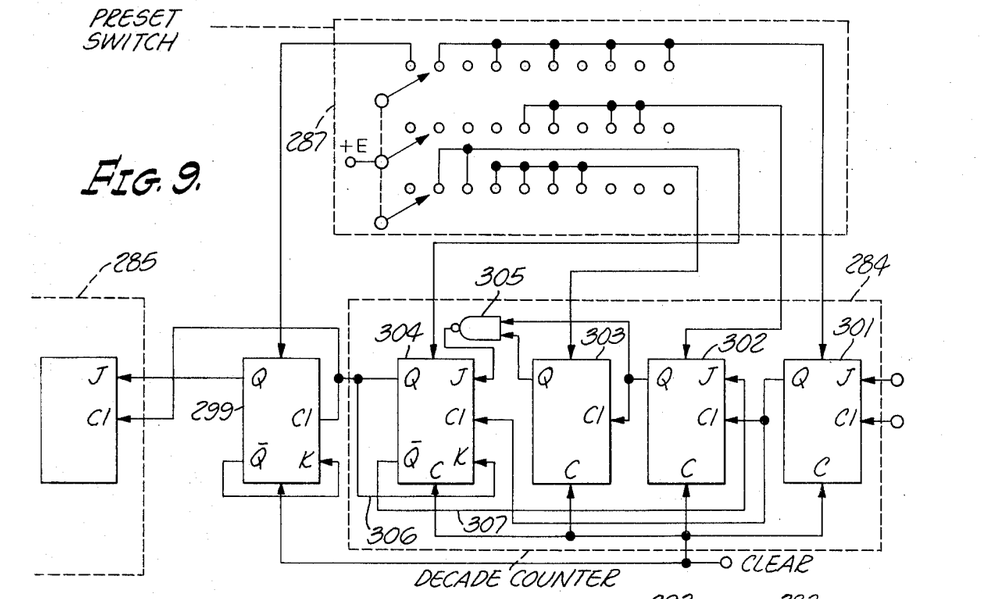

The clock generator 223 typically may have a frequency in the range of one to five megahertz, and the maximum time required to add counts to the B register 15 is in the range of two-hundred microseconds to one millisecond for the 100's decade and two to ten microseconds for the units decades. These addition times are sufficiently fast so as to preclude adverse interacation resulting from the speed with which the sales clerk operates the input levers 108 through 110, but it will be appreciated that each lever is operated individually rather than all together. Other mechanizations of the manual input unit 11 may be provided, such as preset counting techniques or keyboard inputs of the nature of standard adding machines. The arrangement illustrated in FIG. 5 is characterized by relative simplicity and inexpensive construction; however, an alternative circuit employing preset counting techniques which is also relatively simple is shown in FIGS. 8 and 9 and will be described subsequently.

Figure 6:
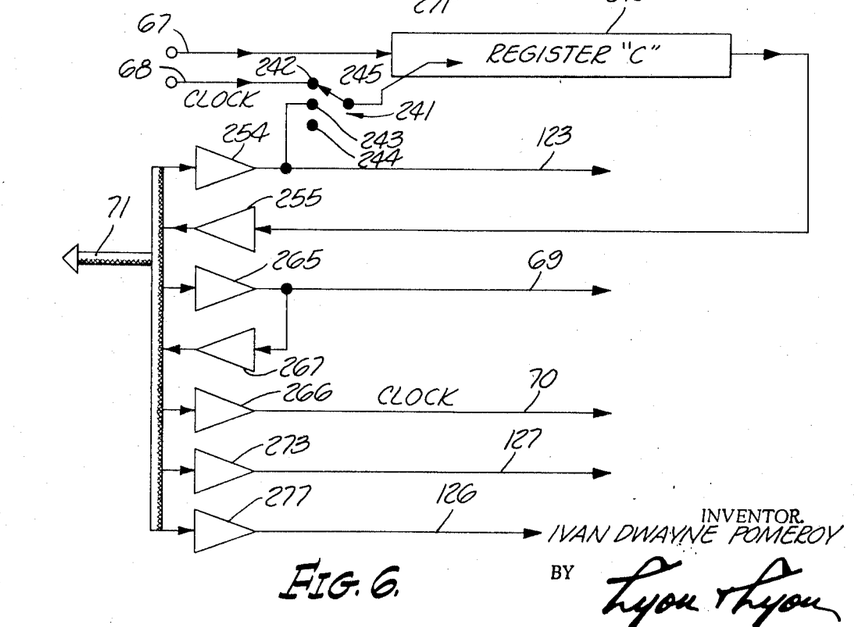
FIG. 6 is a block diagram of a data-phone telephone link.
Figure 7:
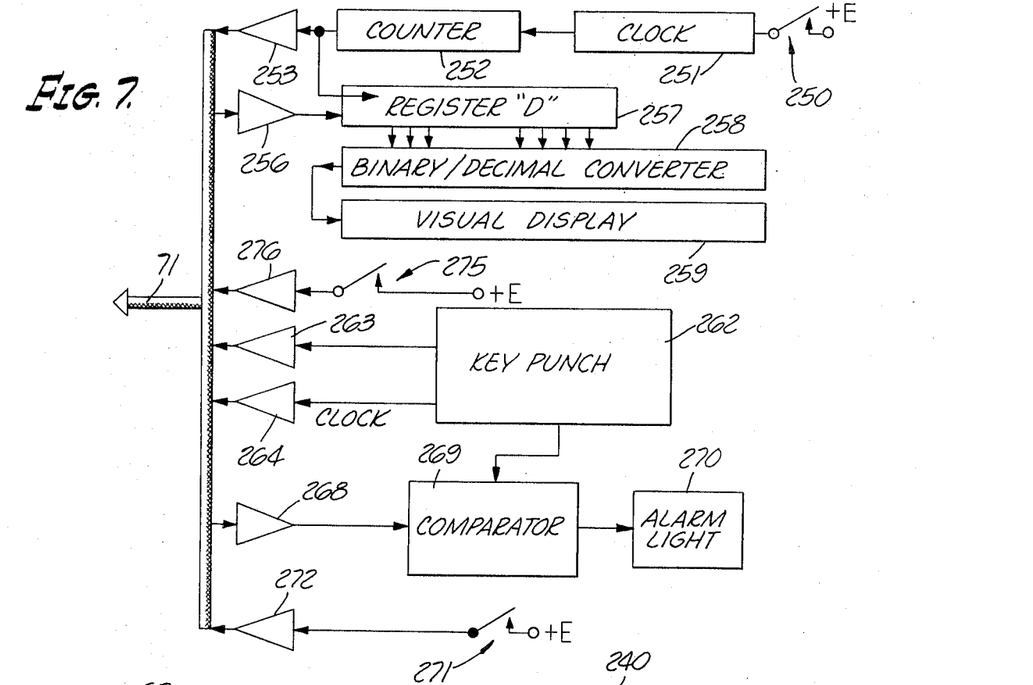
FIG. 7 is a block diagram of a central data file.

Turning now to the data-phone link 16 in FIG. 6 and the central data file 17 in FIG. 7, the former includes a C register 240. The serial number of the credit card is supplied on the line 67 to this register, and the clock signals on the line 68 are supplied through a switch 241 to the clock input of the register 240 as the roller assembly 100 is moved from left to right as described previously. The switch 241 includes three contacts 242 through 244 and a movable contact 245. The line 68 is connected to the fixed contact 242, and the fixed contact 243 is connected to the line 123 which is the interrogation indication line.

When it is desired to contact the central data file 17, such as when a "no-go" indication occurs and it is desired to update the credit balance, a telephone handset is placed in the cradle 112 of the unit 82 in FIG. 2a, and the central data file telephone number is dialed. When the central data operator picks up the receiver, a switch 250 in the central data file 17 shown in FIG. 7 is manually closed to start a clock 251. The output of the clock is counted by a counter 252, the output of which is supplied to a tone generator 253. The output of this tone generator is continuous during the time contact is made with the central data file, and this output is supplied through the cable 71 (telephone link) to the data-phone link 16 shown in FIG. 6 and is received by a tone filter amplifier 254. The output of this amplifier is connected to the fixed contact 243 of the switch 241 and supplies a clock signal through the movable contact 245 to the C register 240 to shift the serial number from this register into a tone generator 255 connected to the output thereof. This clock signal is the interrogate signal on line 123.

The output of the tone generator 255 is connected through the cable 71 to a tone filter amplifier 256 in the central data file 17 in FIG. 7. The tone filter amplifier 256 supplies the serial number to a D register 257 which is clocked by the counter 252. The output of the D register 257 is coupled to a binary to decimal convertor 258 which in turn is coupled to a visual display 259. The central data file operator then reads the display and checks accounting information sheets to determine what update correction, if any, should be made for this particular individual's credit card. The operator also may check to determine if this is a valid card, not a stolen card, and so forth. It should be noted at this point that the various tone generators and tone filter amplifiers communicating with each other operate on the same frequency; whereas the various generator/amplifier combinations operate on different frequencies.

If the credit balance is to be updated, the operator enters the update data by means of a keypunch 262. This keypunch may be similar to the manual input unit 11, but the data is entered in the form of the binary nine's complement. Thus, the complement of the additional balance is supplied to a tone generator 263 and a clock signal is applied to a tone generator 264. These tone generators, operating at different frequencies, are coupled through the cable 71 to respective tone filter amplifiers 265 and 266 in the data-phone link 16 in FIG. 6. The data output of the filter amplifier 265 is connected through the line 69 to the adders 12 and 13 in FIG. 1. The clock output of filter amplifier 266 is supplied through the line 70 to the A and B registers 14 and 15 in FIG. 1. The output of the amplifier 265 also is coupled to the input of a tone generator 267 which communicates with a tone filter amplifier 268 in the central data file 17 in FIG. 7. The output of the amplifier 268 is coupled to a comparator 269 which compares the balance data received by the data-phone link 16 with that entered by the central data operator into the keypunch 262 to ensure that the proper balance was received by the data-phone link 16. If this data does not compare, an alarm light 270 in the central data file 17 is energized to indicate to the operator that this has occurred in which case a reject switch 271 is depressed. The reject switch 271 is coupled to a tone generator 272 which communicates through the cable 71 with a tone filter amplifier 273. The output of the amplifier 273 is supplied on the line 127 to energize the "reject" light 119 in FIG. 1. Inasmuch as the reject light 119 typically is employed for indicating an invalid card, an additional tone generator/filter amplifier link may be provided to signal the sales clerk to retransmit the serial number by restarting the entire credit card data reading sequence. If the returned additional balance properly compares, the central data file operator closes a switch 275 which is coupled to a tone generator 276. This generator communicates through the cable 71 with a tone filter amplifier 277 which is coupled through the line 126 to the update complete light 118 thereby indicating to the sales clerk that the updating process is complete. As noted earlier, the updated balance is now stored in the A register 14, and the updated balance minus the purchase price is now stored in the B register 15. If the "go" light 66 is energized, the sale may be completed. If the "no-go" light 64 is energized, thereby indicating that a carry from the adder 13 is present, the sale is cancelled. When the sale is cancelled, the updated balance in the A register 14 is stored in the credit card through the output line 63 of the register 14, fixed contact 60 and movable contact 61 of the switch 58, and the line 62. Clock pulses for enabling this operation are supplied as the roller assembly 100 is moved from right to left in the same manner described earlier.

It will be apparent that if the round-off approach to the sales price as discussed previously is used there will be an accumulated error in the credit balance stored in the credit card. It should be noted that the precise sales amount is entered manually in the usual fashion on the sales slip. The various sales slips are transferred to the central data file in a conventional manner for accounting and billing. Additionally, the credit balance error is tabulated inasmuch as the rounded-off balance is imprinted on the sales slip through the operation of the unit 82 in FIG. 2a, and any discrepancy may be kept track of in the central data file and appropriately corrected periodically as the credit card data is updated.

In order to ensure that the operation of the various switches interconnecting the components of the present system is fully understood, the positions of each will be given below for each of the program steps. The switch positions shown in the drawings are for the "process A" step. For the start step, the switches 21, 22, 35, 36 and 58 in FIG. 1, the switches 140 and 149 in FIG. 4, the switch 191 in FIG. 5, and the switch 241 in FIG. 6 are all open. The switch 191, it should be noted, closes to supply power to the remainder of the system as the program switch knob 115 is moved to the "process A" step. In the following, the particular fixed contact referred to means the one to which the movable contact of the respective switch is coupled. In the "process A" mode, the switch 21 is on contact 25, the switch 22 is on contact 29, the switch 35 is on the contact 38, the switch 36 is on the contact 43, the switch 58 is open, the switch 140 is on the contact 149, the switch 149 is moved to the left engaging contacts 151 and 152, the switch 191 is on contact 193, and the switch 241 is on the contact 242. In "process B" mode, the switch 21 is open, the switch 22 is on contact 31, the switch 35 is open, the switch 36 is on contact 44, the switch 58 is open, the switch 140 is open, the switch 149 is in an up and thus open position, the switch 191 in on contact 193, and the switch 241 is open. In the "sales complete" mode, the switches 21, 22 and 35 are open, the switch 36 is on the contact 43, the switch 58 is on the contact 57, the switch 140 is on the contact 141, the switch 149 is to the right on contacts 153 and 154, the switch 191 is on the contact 193, and the switch 241 is open. In the "interrogate" mode, the switch 21 is on the contact 26, the switch 22 is on contact 30, the switch 35 is on contact 39, the switch 36 is on contact 42, the switch 58 is open, the switch 140 is open, the switch 149 is up and thus open, the switch 191 is on contact 193, and the switch 241 is on the contact 243. In the "cancel" mode, the switch 21 is open, the switch 22 is on contact 30, the switch 35 is on contact 38, the switch 36 is open, the switch 58 is on contact 60, the switch 140 is on contact 141, the switch 149 is to the right on contacts 153 and 154, the switch 191 is on contact 193, and the switch 241 is open.

A more automatic type purchase price manual input unit 11 utilizing preset counting techniques is illustrated in FIGS. 8 and 9. The clock generator 280 in this case is formed by one inverter 281 and one three input "nand" gate 282 to form a free running astable flip-flop. The counter section includes three decade counters 283 through 285 which may be preset by respective manual keyboard switches 286 through 288, and a fourth decade counter 289 which provides the necessary signal logic which permits the required gating of the clock signal from the clock 280 to form a data input to the adder 13 (FIG. 1).

With the program control switch knob 115 in the "start" position, a clear signal is applied to a terminal 291 which resets all counters and flip-flops. When the knob 115 is moved to the "process A" position, the keyboard switches 286 through 288 may be set and reset at will. Movement of the knob 115 to the "process B" position provides a logic level "one" start signal at an input terminal 292 to the clock generator 280. The clock generator starts and continues to operate until a stop signal of logic level "zero" is generated by a flip-flop 293 following the 100's decade counter 285. The output of the clock 280 is applied on a line 294 and lines 295 and 296 to the counter 289 and an "and" gate 297, respectively. The counters 283 through 285 and 289 operate in a binary coded decimal sequence which will be described in more detail in connection with the description of FIG. 9. The counter 289 provides four logic signals to the gate 297 to permit the first and every tenth clock pulse thereafter on the line 296 to pass through the gate 297 thereby providing the data signal on the output line 48 to the adder 13 in FIG. 1. The output of the counter 289 drives the counter 283 which has been preset by the units switch 286. When the preset count is reached, the output of the counter 283 sets a flip-flop 298 to one, "cocking" or permitting the units counter 283 to thereafter drive the 10's decade counter 284. As the 10's counter 284 preset count is reached, its output sets a flip-flop 299 which similarly "cocks" the 100's decade counter 285. As the 100's counter 285 preset count is reached, its output sets the flip-flop 293 which in turn provides a stop signal to the clock generator 280 thereby completing the operation. The negative pulse output of the clock generator 280 is provided on the line 49 directly as a clock shift signal to the B register 15 and its asscciated adder carry storage flip-flop in the carry loop 52 (FIG. 1). In this manner, the count manually entered by the keyboard switches 286 through 288 is entered in a continuous action to the adder 13 and B register 15.

FIG. 9 illustrates the manner in which each of the counters 283 through 285 and 289 is constructed. The flip-flops 298 and 299, and the four flip-flops in each counter, such as the flip-flops 301 through 304 in the counter 284 as illustrated in FIG. 9 are of the "master-slave" configuration J-K type. A binary coded decimal count sequence is obtained by the reflex feedback and forward logic circuitry employed. After the input stage flip-flop 301 is "cocked" by the application of a logic "one" signal to its J input from the previous flip-flop Q output, the first three stages 301 through 303 count in the ordinary binary mode. The Q output of the first flip-flop 301 is applied as a clock input to the fourth flip-flop 304. At the count of seven, the Q outputs of the second flip-flop 302 and third flip-flop 303 are applied through an "and" gate 305 to the J input of the fourth flip-flop 304 thereby cocking the same. The eighth count then turns on the fourth flip-flop 304 and turns off the first three flip-flops 301 through 303. The ninth count turns on the first flip-flop 301 in a normal fashion. Because of the "toggle" mode cocking obtained by feedback of the Q output of the fourth flip-flop 304 to its on K input through a line 306, and the feedback of a logic level "zero" signal from the $\bar{Q}$ output of the flip-flop 304 by a line 307 to the J input of the flip-flop 302, the tenth count turns off the flip-flops 301 and 304 and is prevented from turning on the flip-flop 302 thus returning the counter to the "zero" state and setting the flip-flop 299. The preset function is provided by the preset switch 287 by setting the counter to the "ten's complement" of the desired decimal digit. The preset switch 287 may be a binary coded decimal output type switch, or a three pole 10 position switch as shown.

The present embodiments of this invention are to be considered in all respects as illustrative and not restrictive, the scope of the invention being indicated by the appended claims rather than by the foregoing description and all changes which come within the meaning and range of equivalency of the claims therefore are intended to be embraced therein.

What is claimed is:

1. In a credit card system wherein individual credit cards have stored therein credit balance data relating to an individual's credit balance, the combination comprising:

first means for cooperating with a credit card for enabling credit information to be read therefrom and stored therein, second means for generating purchase price data, third means including storage means coupled with said first and second means for receiving credit balance data from said credit card and for receiving said purchase price data, said third means combining said credit balance data and said purchase price data and generating an indication if said credit balance is below said purchase price data, fourth means coupled with said first and third means for transferring the original credit balance or the original credit balance minus the purchase price back to said first means for storage in said credit card, and fifth means coupled with said means for communicating with a central data file for receiving an additional credit balance for addition with said original credit balance.

2. The combination of claim 1 wherein:

said first means includes sequential means for interrogating a credit card to read said credit balance data therefrom or to store credit balance data therein, said second means includes sequential means for generating said purchase price data, said third means includes a first register means for receiving the credit balance data from said credit card and a second register means for storing the difference between the said credit balance and the purchase price, and said fourth means includes switch means for selectively coupling either said first or second register means with said first means for returning respectively either said original credit balance or the original credit balance minus said purchase price back to said credit card.

3. The combination of claim 1 wherein said credit card has stored therein identification data, and said first means includes sequential means for reading said identification data from said credit card and transferring the same to said fifth means.

4. The combination of claim 2 wherein said credit card has stored therein identification data, and said first means includes sequential means for reading said identification data from said credit card and transferring the same to said fifth means.

5. A credit card system wherein individual credit cards have stored therein credit balance data in a complement form relating to an individual's credit balance, the combination comprising:

credit balance read/write and purchase price input unit means including a read/write assembly for receiving a credit card and interrogating the same, and a purchase price assembly for generating purchase price data, storage means coupled with said unit means for receiving credit data from a credit card and purchase price data generated by said purchase price assembly, said storage means including a first register means for receiving and storing said credit data, and including adding and register means for receiving said credit data and said purchase price data and storing the difference therebetween, and control means coupled with said unit means and said storage means for allowing either said credit data or said difference to be returned to said unit means for storage in a credit card.

6. A credit card system as in claim 5 wherein:

said credit card includes magnetic storage means in which said credit balance data is stored and includes identification data, said read/write assembly includes means for reading said credit data from said card and reading credit data into said card, and said system includes data-phone means coupled with said unit means and said storage means for receiving said identification data from said unit means and for supplying additional credit data to said storage means.

7. A credit card system as in claim 6 wherein:

said credit card includes a card member having a plurality of magnetic cores embedded therein and apertures for allowing electrical conductors to extend through said card and said cores, and said unit means includes a plurality of selectable electrical conductors adapted to be inserted through said cores for reading data from said cores and writing data into said cores.

8. A credit card system as in claim 7 wherein:

said storage means includes adding means coupled with said first register means for enabling additional credit data from said data-phone means to be added with the original credit balance data and the sum thereof to be stored in said first register means, and said adding and register means includes a second adding means coupled with a second register means, and said control means includes switch means coupled with said first and second register means for selectively supplying the contents of either said first or second register means to said unit means, and said control means includes switch means coupled with said said unit means, said storage means and said data-phone means for supplying either the credit data from said credit card or additional credit data from said data-phone means to said storage means.

References Cited

UNITED STATES PATENTS

| | | | |
|---|---|---|---|
| 2,910,673 | 10/1959 | Bloch et al. | 336—65X |
| 3,221,304 | 11/1965 | Enikeieff et al. | 340—149 |
| 3,273,134 | 9/1966 | Lamaire et al. | 336—65UX |
| 3,394,246 | 7/1968 | Goldman | 235—61.7 |
| 3,407,387 | 10/1968 | Looschen et al. | 340—152 |
| 3,403,380 | 9/1968 | Welch | 317—134X |

DONALD J. YUSKO, Primary Examiner

U.S. Cl. X.R.

235—61.7; 340—149